(12) United States Patent
Sanda et al.

(10) Patent No.: US 8,886,813 B2
(45) Date of Patent: *Nov. 11, 2014

(54) SYSTEMS AND METHODS FOR PROVIDING SECURE COMMUNICATIONS FOR TRANSACTIONS

(71) Applicant: Japan Communications Inc., Tokyo (JP)

(72) Inventors: Frank S. Sanda, Tokyo (JP); Naohisa Fukuda, Karuizawamachi (JP); Marc Winn, Atlanta, GA (US); Mitsutera Okazaki, Yamato (JP); Paul Royer, Larkspur, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,552

(22) Filed: Mar. 11, 2013

(65) Prior Publication Data

US 2013/0276073 A1   Oct. 17, 2013

Related U.S. Application Data

(63) Continuation of application No. 11/517,167, filed on Sep. 7, 2006, now Pat. No. 8,533,338.

(60) Provisional application No. 60/784,183, filed on Mar. 21, 2006.

(51) Int. Cl.
| | |
|---|---|
| *G06F 15/16* | (2006.01) |
| *H04W 12/06* | (2009.01) |
| *H04L 29/06* | (2006.01) |
| *G06F 21/42* | (2013.01) |
| *G06F 21/33* | (2013.01) |

(52) U.S. Cl.
CPC .............. *H04W 12/06* (2013.01); *H04L 63/08* (2013.01); *G06F 21/42* (2013.01); *G06F 21/33* (2013.01)
USPC ........................... 709/227; 709/228; 709/229

(58) Field of Classification Search
USPC ......................................... 709/227, 228, 229
See application file for complete search history.

(56) References Cited

U.S. PATENT DOCUMENTS

| 5,406,261 A | 4/1995 | Glenn |
|---|---|---|
| 5,748,084 A | 5/1998 | Isikoff |

(Continued)

FOREIGN PATENT DOCUMENTS

| EP | 0849909 A2 | 6/1998 |
|---|---|---|
| EP | 0849909 A3 | 2/1999 |

(Continued)

OTHER PUBLICATIONS

Anonymous. 3rd Generation Partnership Project, Technical Specification Group service and system aspects, 3G security, wireless local area network (WLAN) interworking security (release 6). #GPP TS 33.234. Online! 2004; 11-18, 22-22.

(Continued)

*Primary Examiner* — Harunur Rashid
(74) *Attorney, Agent, or Firm* — Wilson, Sonsini, Goodrich & Rosati

(57) ABSTRACT

Embodiments of the present invention provide systems and methods for providing secure communications. One aspect of an embodiment of the invention creates a virtual private connection to a remote server or network utilizing a connection server and at least one direct connection between a client device and the remote server, without utilizing the Internet. In another aspect of an embodiment of the present invention, a client operating system is taken over by a vertical function operating system to service the communication with the remote server. Still another aspect of an embodiment of the present invention comprises a client device establishing a connection with a remote server through a connection server and at least one direct connection, shutting down a first operating system, starting up a second secure operating system, and launching an interface application with the second operating system to conduct electronic transactions with the remote server.

21 Claims, 3 Drawing Sheets

(56) References Cited

U.S. PATENT DOCUMENTS

| | | | |
|---|---|---|---|
| 5,936,526 | A | 8/1999 | Klein et al. |
| 6,104,716 | A * | 8/2000 | Crichton et al. ............. 370/401 |
| 6,198,920 | B1 | 3/2001 | Doviak et al. |
| 6,252,869 | B1 | 6/2001 | Silverman |
| 6,253,326 | B1 | 6/2001 | Lincke et al. |
| 6,418,324 | B1 | 7/2002 | Doviak et al. |
| 6,546,425 | B1 | 4/2003 | Hanson et al. |
| 6,865,162 | B1 | 3/2005 | Clemm |
| 6,988,147 | B2 * | 1/2006 | King ............................ 709/239 |
| 2001/0032254 | A1 * | 10/2001 | Hawkins ...................... 709/219 |
| 2002/0052968 | A1 | 5/2002 | Bonefas et al. |
| 2002/0078135 | A1 | 6/2002 | Venkatsubra |
| 2002/0133584 | A1 | 9/2002 | Greuel et al. |
| 2002/0157019 | A1 * | 10/2002 | Kadyk et al. .................. 713/201 |
| 2003/0005331 | A1 | 1/2003 | Williams |
| 2003/0051140 | A1 | 3/2003 | Buddhikot et al. |
| 2003/0056116 | A1 | 3/2003 | Bunker et al. |
| 2003/0123446 | A1 | 7/2003 | Muirhead et al. |
| 2003/0191843 | A1 * | 10/2003 | Balissat et al. ................ 709/227 |
| 2003/0212548 | A1 | 11/2003 | Petty |
| 2003/0236827 | A1 | 12/2003 | Patel et al. |
| 2004/0030887 | A1 | 2/2004 | Harrisville-Wolff et al. |
| 2004/0039807 | A1 | 2/2004 | Miguel et al. |
| 2004/0044739 | A1 | 3/2004 | Ziegler |
| 2004/0078601 | A1 * | 4/2004 | Tengwall et al. ............. 713/201 |
| 2004/0123150 | A1 | 6/2004 | Wright et al. |
| 2005/0025184 | A1 | 2/2005 | Dowling et al. |
| 2005/0086533 | A1 * | 4/2005 | Hsieh ........................... 713/201 |
| 2006/0026268 | A1 | 2/2006 | Sanda et al. |
| 2006/0075472 | A1 | 4/2006 | Sanda et al. |
| 2007/0177507 | A1 * | 8/2007 | Chavda ........................ 370/235 |
| 2007/0226350 | A1 | 9/2007 | Sanda et al. |
| 2008/0130900 | A1 | 6/2008 | Hsieh |

FOREIGN PATENT DOCUMENTS

| | | |
|---|---|---|
| EP | 0899647 A2 | 3/1999 |
| EP | 0899647 A3 | 2/2000 |
| EP | 1059782 A2 | 12/2000 |
| EP | 1320013 A2 | 6/2003 |
| EP | 1059782 A3 | 2/2004 |
| EP | 1320013 A3 | 6/2005 |
| GB | 2210482 | 6/1989 |
| JP | 2004-158025 | 6/2004 |
| WO | WO 99/00958 A1 | 1/1999 |
| WO | WO 00/05684 A2 | 2/2000 |
| WO | WO 00/05684 A3 | 5/2000 |
| WO | WO 00/78004 A2 | 12/2000 |
| WO | WO 01/35585 A1 | 5/2001 |
| WO | WO 00/78004 A3 | 8/2001 |
| WO | WO 01/89249 A1 | 11/2001 |
| WO | WO 02/23362 A1 | 3/2002 |
| WO | WO 02/41580 A1 | 5/2002 |
| WO | WO 02/077816 A1 | 10/2002 |
| WO | WO 02/091662 A1 | 11/2002 |
| WO | WO 03/073782 A1 | 9/2003 |
| WO | WO 2004/008693 A1 | 1/2004 |
| WO | WO 2004/014011 A2 | 2/2004 |
| WO | WO 2004/021114 A2 | 3/2004 |
| WO | WO 2004/021114 A3 | 5/2004 |
| WO | WO 2004/014011 A3 | 6/2004 |
| WO | WO 2006/012610 A2 | 2/2006 |

OTHER PUBLICATIONS

Barberis, et al. A simulation study of adaptive voice communication on IP networks. Computer Communications. May 2001.

DOD. Department of Defense Trusted Computer System Evaluation Criteria. The Rainbow Books. Dec. 26, 1995.

Escobedo, et al. Convivo Communicator: an interface-adaptive VoIP system for poor quality networks. J. Info. Comm Ethics Soc. (ICES) Jul. 2003.

Gavi. Service Level Management for IP Networks. 38th European Telecommunications Congress. Proceedings Networking the Future. 1999; 106-109.

Hoene, et al. A perceptual quality model for adaptive VoIP applications. Internet article. Jul. 2004.

Homayounfar. Rate adaptive speech coding for universal multimedia access. IEEE Signal Processing Magazine. Mar. 2003.

International Preliminary Report on Patentability dated Mar. 19, 2009 for PCT/US2007/064412.

International Search Report and Written Opinion dated Feb. 2, 2006 for PCT/US2005/023278.

International Search Report and Written Opinion dated Feb. 12, 2005 for PCT/US2005/021370.

International Search Report and Written Opinion dated Jul. 17, 2006 for PCT/US2005/046665.

International Search Report and Written Opinion dated Oct. 24, 2005 for PCT/US2005/022983.

International Search Report and Written Opinion dated Oct. 27, 2005 for PCT/US2005/022982.

International Search Report and Written Opinion dated Nov. 4, 2005 for PCT/US2005/022984.

International Search Report and Written Opinion dated Nov. 16, 2005 for PCT/US2005/023280.

International Search Report and Written Opinion dated Nov. 18, 2005 for PCT/US2005/022586.

International Search Report and Written Opinion dated Nov. 26, 2008 for PCT/US2007/064412.

International Search Report and Written Opinion dated Nov. 28, 2005 for PCT/US2005/021526.

Matsunaga, et al. Secure Authentication System for Public WLAN Roaming. WMASH. Proceedings of the 1st ACM Int. Workshop on Wireless Mobile Applications and Servicces on WLAN hotspots. 2003; 113-121.

Mehrpour, et al. Packet voice transmission using Java programming language. Tencon 97 IEEE region 10 annual conference. Dec. 1997.

Office action dated Mar. 25, 2010 for U.S. Appl. No. 11/517,167.

Office action dated Apr. 22, 2009 for U.S. Appl. No. 11/517,167.

Office action dated May 10, 2011 for U.S. Appl. No. 11/517,167.

Office action dated Jun. 6, 2012 for U.S. Appl. No. 11/517,167.

Office action dated Aug. 4, 2010 for U.S. Appl. No. 11/517,167.

Office action dated Oct. 20, 2011 for U.S. Appl. No. 11/517,167.

Office action dated Nov. 19, 2009 for U.S. Appl. No. 11/517,167.

SNMP: Simple Network Management Protocol Des IAB. NTZ (Nachrichtentechnische Zeitschrift) VDE Verlag GmbH. 1995; 48(6):20-22.

European search report and opinion dated Jun. 6, 2014 for EP Application No. 07758916.6.

* cited by examiner

SYSTEMS AND METHODS FOR PROVIDING SECURE COMMUNICATIONS FOR TRANSACTIONS

CROSS-REFERENCE

This application is a continuation application of Ser. No. 11/517,167, filed Sep. 7, 2006, which claims the benefit of U.S. Provisional Application No. 60/784,183, filed Mar. 21, 2006, both of which are incorporated herein by reference in their entirety.

FIELD OF THE INVENTION

The present invention relates generally to computer networking and, more particularly to systems and methods for providing secure communications for transactions.

BACKGROUND

Increasingly, people are engaging in financial and other sensitive electronic transactions on the Internet. Electronic transactions can include electronic bill paying, Internet banking, electronic auctions, electronic funds transfer, and electronic securities trading. Additionally, people desire remote access to networks, such as their employers network. Currently, remote access, including remote access for electronic transactions, is performed via a client device, such as a personal computer, through a public-wide area network, such as the Internet. Similarly, there is an increasing amount of fraud occurring with respect to transactions and communications over the Internet.

Internet fraud currently occurs essentially from two sources: 1) the Internet connection itself; and 2) operating-system based client devices, such as the Microsoft® operating system-based client devices. These sources make the typical online electronic transaction subject to fraud. On the first source, the Internet connection, the Internet is a public network, and, as such, many ports are available and accessible by the public. The direction and advancement and the use of Internet access network technology have resulted in the growth of available bandwidth for the user. The more bandwidth, the higher speed of Internet accesses. This direction encourages the "always on" use behavior by the user, which is further exacerbated by fixed tariffs. This means that the user can just leave the Internet access connected continuously so that he/she does not have to undertake the cumbersome process of initiating the operating system and network connectivity. While this situation may provide convenience, this also offers an optimal environment for intrusion of unwanted software into the client terminal through multiple open ports. While port protection technology is available, in most cases the technical challenge associated with its use mitigates against adoption by the masses. Additionally, the code on Web pages, such as a financial institution's Web page, is HTML code and is exposed to the public. Thus, hackers can exploit the accessibility of the Internet to obtain information in electronic transactions.

Most conventional remote access solutions utilize the Internet to provide connectivity between a user on a client device and a server. Remote access solutions that utilize leased line or direct line connections are available, but are cost prohibitive for the average user. Generally, only senior members of an organization may have a direct line connection from a remote location, such as a residence, to the organization's network and servers.

Second, given that most client devices utilize the Windows® operating system from Microsoft Corp., most perpetrators of fraud focus most of their attention on creating software for their purposes to reside on these devices. This type of software, which is generally classed as "spyware" or "malware," can lay in waiting on Windows® operating system-based devices. Then unbeknownst to its user such spyware can come alive in certain circumstances where fraudulent activity can be activated. Spyware is capable of recording keystrokes or otherwise capturing sensitive information of a user in order to facilitate unwanted access to "secure" sites. Therefore, a solution is needed to provide secure communications for electronic transactions.

SUMMARY

Embodiments of the present invention provide systems and methods for providing secure communications. One aspect of an embodiment of the invention creates a virtual private connection to a remote server or network utilizing a wireless modem and at least one direct connection between a client device and the remote server, without utilizing the Internet. In another aspect of an embodiment of the present invention, a client operating system is taken over by a vertical function operating system to service the communication with the remote server. Still another aspect of an embodiment of the present invention comprises a client device establishing a connection with a remote server through a wireless modem and at least one direct connection, shutting down a first operating system, starting up a second secure operating system, and launching an interface application with the second operating system to conduct electronic transactions with the remote server.

These illustrative embodiments are mentioned not to limit or define the invention, but to provide an example to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for providing secure communication for electronic transactions. There are multiple embodiments of the present invention. By way of introduction and example, one illustrative embodiment of the present invention provides a system and method for providing a private network through which a user on a client device can interface with a remote server. The remote service may be a financial transaction server associated with a financial institution or other financial intermediary, to conduct an electronic transaction or it may be a server associated with a private network.

In one embodiment, the client device accesses the remote server, such as on a private network, without accessing an unsecured public network. The client device may have a wireless modem and establish a connection via the wireless modem over a wireless network to a server at a telecommunication provider's data center. This telecommunication providers server may then be directly connected through, for example, a leased line connection to a connection server. The connection server may be connected to the remote server via a direct connection, such as a leased line connection. This creates a secure private network for the client device. The client device may then communicate securely with the remote server. The client device may then access and transact on the user's financial accounts if the remote server is associated with a financial institution, can submit payment for goods or services from an auction or retailer, or can access proprietary information on an organization's remote network.

In one embodiment, a capacity management application on the connection server controls information traffic between the remote server and the client device.

In one embodiment, an access engine on the client device shuts down all other applications when such a private network is established. The connection server may also authenticate the client device for only authorized applications on the remote server.

The client device may be capable of switching operating systems from a Windows operating system before, during, or after the connection with the remote server has taken place in order to prevent any Windows-based spyware or other malware from obtaining sensitive information during the electronic transaction with the application server. Alternatively, the client device may also operate on a relatively more secure operating system, such as Linux, and not use a Windows operating system from Microsoft Corp. In some embodiments, the client device operates on an unsecured Linux operating system.

This introduction is given to introduce the reader to the general subject matter of the application. By no means is the invention limited to such subject matter. Illustrative embodiments are described below.

System Architecture

Figure 1:
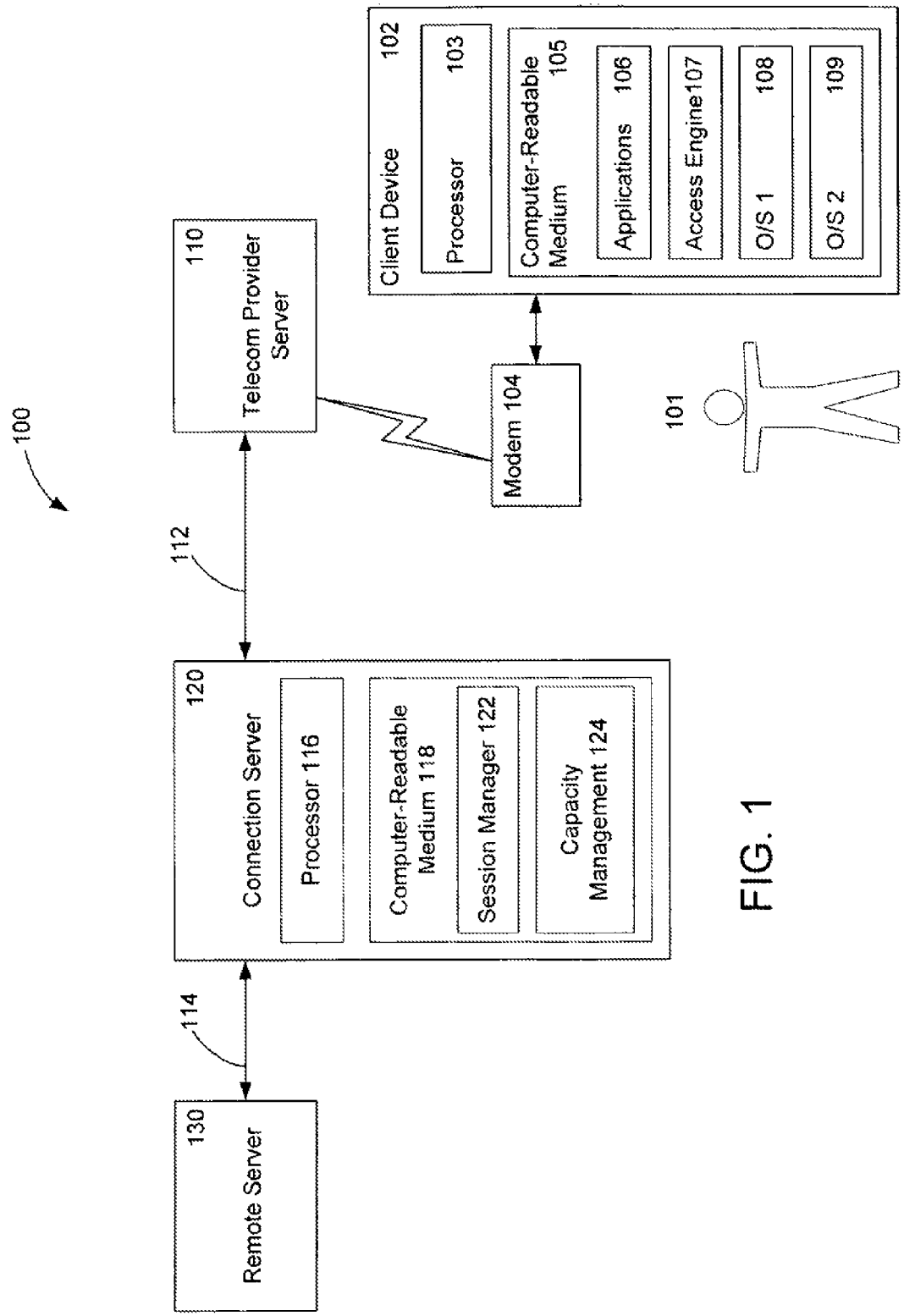
FIG. 1 is a block diagram showing an illustrative environment for implementation of one embodiment of the present invention.

Various systems in accordance with the present invention may be constructed. Referring now to the drawings, FIG. 1 shows one exemplary embodiment of a system of the present invention. The system 100 includes a client device 102 with a communications device, such as a modem 104. The modem 104 may be a wireless modem and can establish a connection over a wireless network to a telecommunications provider server 110. The telecommunications provider server 110 may be connected to a connection server 120 via a direct connection 112, such as a leased line connection. The connection server 120 may then be connected to a remote server 130 via a direct connection 114, such as a leased line connection. In another embodiment, the system 100 does not include a connection server 120 and the provider server 110 is connected directly to the remote server 130 via a leased line connection.

Although FIG. 1 includes only a single client 102, provider server 110, connection server 120, and remote server 130, an embodiment of the present invention includes a plurality of clients 102 and may include a plurality of provider servers 110, connection servers 120, and remote servers 130.

Examples of client device 102 are personal computers, digital assistants, personal digital assistants, cellular phones, mobile phones, smart phones, pagers, digital tablets, laptop computers, Internet appliances, and other processor-based devices. In general, a client device 102 may be any suitable type of processor-based platform that can transmit and receive data via a communications device, such as the modem 104, and that interacts with one or more application programs 106 and 107. The client device 102 can contain a processor 103 coupled to a computer-readable medium 105, such as RAM, which can contain the application programs 106. In one embodiment, client device 102 contains an access engine application 107 and two operating systems 108 and 109. For example, the client device 102 may mainly operate a Microsoft® Windows® operating system, but operate on a Linux operating system when connected to the remote server 130 during an electronic transaction. The second operating system 109 may be located in memory 105 as shown or may be an embedded operating system for a transaction interface application. The access engine 107 can control the set up and connection of the client device 102 with the provider server 110 and ultimately with the remote server 130. The access engine 107 can also control the switching from a first operating system 108 to a second operating system 109.

In one embodiment, the access engine 107 is part of an access system, such as the bAccess™ system from Japan Communications, Inc., as described in U.S. patent application Ser. Nos. 11/167,744 (filed Jun. 27, 2005) and Ser. No. 11/168,847 (filed Jun. 28, 2005), which are both incorporated herein by this reference. The access system may operate below the driver level of an operating system, but above the core of the operating system. For example, this can allow the access engine 107 to operate below the driver level of the Windows operating system to establish the connection of the client device 102 to the remote server 130 via the connection server 120 and provider server 110.

A user 101 can interact with the client device 102 by, for example, a keyboard, pointing device, and display (not shown). The modem 104 can be, for example, a PCMCIA card with a cellular modem capable of communicating via a wireless communications network, such as, for example, Personal Handy-phone System ("PHS") network or a Code Division Multiple Access ("CDMA")-based network. In some embodiments, a third-generation mobile telephone technology ("3G") network may be used.

If the modem 104 is a wireless modem, then communications from the client device are passed through the modem 104 through a wireless network, such as a PHS or CDMA network, to the provider server 110 in the telecommunications provider's data center. Digital wireless communication provides a robust security standard that is hardware identification driven. For example, wireless devices use electronic serial numbers that are in the device and drives an encryption. In other embodiments, the modem may be a cable modem or a Digital Subscriber Line ("DSL") modem and can be used to pass communications to and from the client device 102 to a server 110 at the user's Internet Service Provider (ISP).

The servers can also be processor-based server devices that contain a processor coupled to a computer-readable medium, such as RAM or other type of memory, which can contain one or more application programs. For example, the connection server 120 can contain a processor 116 that can access a computer-readable medium 118. The computer-readable medium 118 can contain a session manager application program 122 that can facilitate establishing a connection through leased lines with the provider server 110 and the remote server 130. The session manager application 122 may also perform authentication functions for the user 101 and client device 102. In addition, the computer-readable medium 118 can contain a capacity management application 124 for controlling the information traffic between the remote server 130 and client device 102.

The remote server 130 may interact with other server devices and databases and may contain application programs that allow interaction with a client device in order to perform electronic transactions. In some embodiments, bAccess™ software may be utilized to restrict applications available on the client device to particular applications designed for the transaction and/or to optimize the interaction between the client device and the remote server 130. By restricting applications available to the client device, the interaction may also experience relatively enhanced performance and a relative decrease in the bandwidth needed for effective communication between the client device and remote server 130. Decreasing the bandwidth needed may decrease the cost of the communication between the client device and remote server 130. The electronic transactions can include, for example, electronic bill paying, electronic funds transfer, and securities or other financial instruments trading. The remote server 130 may be associated with a financial institution, such as a bank or brokerage. The remote server may also be associated with a financial intermediary, such as PayPal®. The remote server 130 authenticates the user 101, such as through user name, password, account number, and other authentication techniques. The client device 102 can run a Web browser application to interact with the remote server 130. While to the user it appears that the user is interacting with the financial institution's website, the connection is over a secure direct connection.

In other embodiments, the remote server may be associated with a private network, such as a corporate network. The user 101, in this embodiment, can communicate with the private network through the secure connection and can access sensitive information in a secure manner.

The establishment of the secure connection as explained above enables the same capability heretofore only affordable for the senior most corporate executives (a direct connection to a remote server), to be available to the masses. Cost reduction is accomplished by making the transport application specific through an interface (such as a bAccess interface) and connection server, which will only authenticate the user for a specific application. When the modem 104 (such as a mobile data card wireless modem) is connected to the client device 102 the access engine 107 and/or the connection server 120 may restrict applications running on the client device 102 to only those designated for access to the remote server 130. The communication path between the client device 102 and the remote server 130 may be controlled by one or more of the modem 104, the access engine 107, and the connection server 120. Further cost reduction and lower price may be achieved by managing the actual number of packets that flow through this private network.

Illustrative Method of Providing Secure Communications

Figure 2:
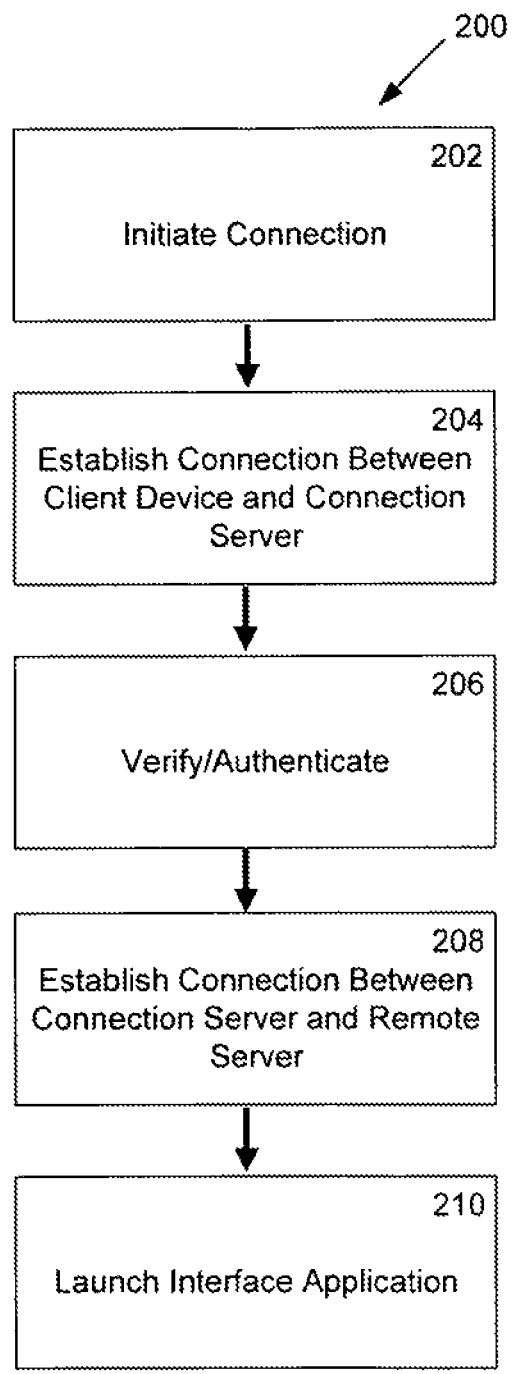
FIG. 2 is a flowchart illustrating a process for providing secure communications.

Various methods in accordance with embodiments of the present invention may be carried out. FIG. 2 illustrates an illustrative method 200 for providing secure communications that may be implemented by the session manager 122 or access engine 107, as shown in FIG. 1. This illustrative method is provided by way of example, as there are a variety of ways to carry out methods according to the present invention. The method 200 shown in FIG. 2 can be executed or otherwise performed by one or a combination of various systems. The system shown in FIG. 1 and described above is used for illustration purposes.

In step 202, a connection with a communications server is initiated. In one embodiment, the initiation of the connection may be caused by the activation of the modem 104 of the client device 102. For example, if the modem 104 is a PCM-CIA card, then connecting the modem 104 to the client device 102 initiates the connection with the connection server 120.

In step 204, a connection is established. In one embodiment, the modem 104 connects to the provider server 110 via a wireless network, such as PHS or CDMA. The provider server 110 is connected to a connection server 120 via a leased line connection 112. In one embodiment, the connection server 120 receives the initiated connection from the client device 102 via the provider server 110. As described above, the access engine 107 can operate below the driver level of an operating system to establish the connection. For example, in one embodiment, while a Windows operating system is running, the access engine 107 operates below the Windows operating system driver level and above the operating system core to establish the connection.

In step 206, the connection server 120 verifies and/or authenticates the client device 102 and the user. The connection server 120 may utilize the session manager application 122 to receive the connection from the client device 102 and verify and/or authenticate the client device 102 and the user. In some embodiments, the connection server 120 does not verify or authenticate the client device 102 and the user. In these embodiments, the connection server 120 establishes a connection with the remote server 130 after receiving the initiated connection from the client device 102 and then the remote server 130 may authenticate the client device 102 and the user.

In step 208, the communication server 120 utilizes the session manager application 122 to establish a direct connection with the remote server 130. For example, the session manager application 122 can initiate a signal to the remote server 130 and receive signals from the remote server 130 indicating that a direct connection is established between the communication server 120 and the remote server 130. The signals may be packets of information such as identification of the connection server 120, request for establishing a direct connection, and/or identification of the client device 102. In one embodiment, the connection server 120 is connected to the remote server 130 via a leased line connection 114.

In step 210, a transaction interface application is launched on the client device 102. In one embodiment, the interface application is a Web browser application and may reside in memory 105 of the client device. In one embodiment, the session manager application 122 can launch the transaction interface application on the client device 102. The remote server 130 can interface with the client device 102 via the interface application. For example, the remote server 130 can use an HTML Web page to interact with the user 101. The connection between the client device 102 and the remote server is a private, direct connection and does not utilize a public network, such as the Internet. The remote server 130 may transmit only the essential data to the client device 102 in order to reduce the amount of data transmitted over the wireless network, which can reduce the cost of the method of secure communication. The connection server 120 may utilize the capacity management application 124 to manage the packets transmitted over the connections in an effort to reduce the cost of communication.

Figure 3:
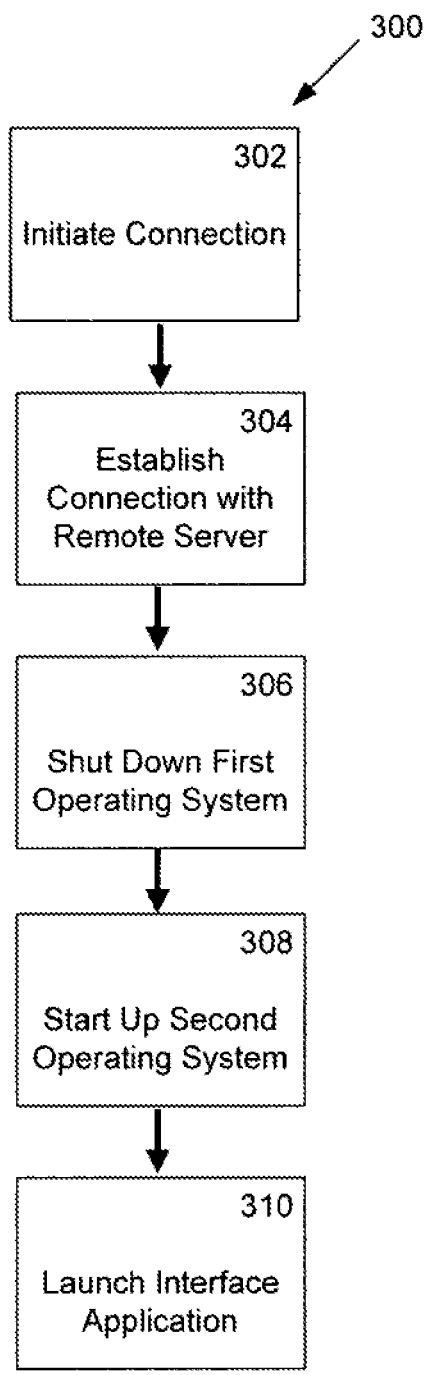
FIG. 3 is a flowchart illustrating another embodiment of a process for providing secure communications.

FIG. 3 illustrates another illustrative method 300 for providing secure communications that may be implemented by the session manager 122 or access engine 107, as shown in FIG. 1. In step 302, a connection with the remote server is initiated. In one embodiment, the initiation of the connection may be caused by the activation of the modem 104 of the client device 102. For example, if the modem 104 is a PCMCIA card, then connecting the modem 104 to the client device 102 initiates the connection with the remote server 130 through the connection server 120.

In step 304, a connection with the remote server 130 is established. In one embodiment, the modem 104 connects to the provider server 110 via a wireless network, such as PHS or CDMA. The provider server 110 is connected to a connection server 120 via a leased line connection 112. The connection server 120 receives the initiated connection from the client device 102 and initiates a connection with the remote server 130.

In step 306, the first operating systems shuts down. In one embodiment, as described above, the client device 102 runs a Windows® operating system and the connection with the remote server 130 is established while running the Windows® operating system. In this embodiment, the connection server 120 can shut down the Windows® operating system. In another embodiment, the access engine 107 can shut down the Windows® operating system. The connection to the remote server 130 can be maintained with the modem during the shut down of the Windows® operating system. The access engine 107 can begin shutting down the Windows® operating system at the same time it is establishing the connection with the remote server 130. In another embodiment, the Windows® operating system is shut down before the connection with the remote server is established. It is desirable to have the Windows® operating system shut down or put to sleep before the user 102 engages in any transactions with the remote server 130. This way, any spyware or other malware that has embedded itself in the Windows operating system is rendered functionless. In another embodiment, the first operating system, such as a Windows® does not shut down and a second operating system, such as Linux, runs as a process of the first operating system. In this embodiment, the second operating system runs on top of the first operating system. The second operating system can access at least a portion of memory and remove any spyware or malware.

In another embodiment, the first operating system is not completely shut down. Rather, the access engine 107 may allow only certain applications to run during the secure connection. The connection server 120 may further authenticate the client device 102 and user 101 and ensure that only appropriate applications are running on the client device 102 and that client device 102 is engaged in appropriate communications with the remote server 130

Returning now to FIG. 1, after the first operating system is shut down, the second operating system is started up at step 308. In one embodiment, the connection server 120 can start up the second operating system. For example, after the Windows operating system is shut down or put to sleep, a Linux operating system or other secure operating system can be started up. This can occur before, during or after the connection to the remote server 130 is made. The second operating system 109 can reside and be run from memory 105, as shown in FIG. 1. Alternatively, the second operating system can be an embedded operating system for a transaction interface application. Using an open source operating system, such as Linux, reduces the potential for harmful malware being resident on the computer that may obtain personal and confidential information during electronic transactions using the communication method 200.

In step 310, a transaction interface application is launched on the client device 102. In one embodiment, the interface application is a Web browser application and may reside in memory 105 of the client device. The remote server 130 can interface with the client device 102 via the interface application. For example, the remote server 130 can use an HTML Web page to interact with the user 101. The connection between the client device 102 and the remote server is a private, direct connection and does not utilize a public network, such as the Internet. The remote server 130 may transmit only the essential data to the client device 102 in order to reduce the amount of data transmitted over the wireless network, which can reduce the cost of the method of secure communication. The connection server 120 may utilize the capacity management application 124 to manage the packets transmitted over the connections in an effort to reduce the cost of communication.

General

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method for providing secure communications for electronic transactions, comprising:
   receiving an initiating connection signal from a client device at a connection server through a first direct connection that is between the client device and the connection server, wherein the client device and the connection server are addressable privately only, and the connection server comprising a session manager and a capacity management application for controlling a capacity of information traffic between the client device and a remote server to enable management of packets transmitted therebetween to selectively reduce cost of communication;
   establishing a first communications link between the connection server and the client device through the first direct connection, wherein a first data transmission path for the first communications link is identifiable;
   initiating a connection signal from the connection server to a remote server with the session manager application through a second direct connection that is between the connection server and the remote server;
   establishing a second communications link between the connection server and the remote server through the second direct connection, wherein the remote server is addressable privately only and a second data transmission path for the second communications link is identifiable; and
   creating a secure private connection between the client device and the remote server upon the client device being connected with the remote server to perform electronic transactions through the connection server and over the first direct connection and the second direct connection.

2. The method of claim 1, wherein the capacity management application manages an actual number of packets that flow between the client device and the remote server.

3. The method of claim 1, wherein the session manager authenticates the client device and an identity of a client device user before establishing the first communications link based on credentials for establishing the secure private connection between the client device and the remote server.

4. The method of claim 1, further comprising authenticating, by the connection server, the client device and an identity of a client device user.

5. The method of claim 1, further comprising launching, by the connection server, a transaction interface application on the client device.

6. The method of claim 1, wherein the first direct connection between the client device and the connection server is over a wireless network with one or more network end-points and intermediate points that are addressable privately only.

7. The method of claim 1, wherein the first direct connection includes a section of a wireless data transmission and the second direct connection includes a leased line connection.

8. A connection server comprising:
one or more processors;
one or more non-transitory computer-readable storage media having stored thereon executable instructions that, when executed by the one or more processors, cause the connection server to provide:
a session manager application for establishing a first communications link between the connection server and a client device through a first direct connection and for establishing a second communications link between the connection server and a remote server through a second direct connection, wherein the client device, the connection server, and the remote server are each addressable privately only, and a first data transmission path for the first communications link and a second data transmission path for the second communications link are each identifiable, and wherein the connection server creates a secure private connection between the client device and the remote server to perform electronic transactions through the first communications link and the second communications link; and
a capacity management application for controlling the capacity of information traffic between the client device and the remote server, which takes place across the first direct connection that is between the client device and the connection server, and the second direct connection that is between the connection server and the remote server to enable management of packets transmitted therebetween to selectively reduce cost of communication.

9. The connection server of claim 8, wherein the session manager application is adapted to authenticate the client device and an identity of a client device user.

10. The connection server of claim 8, wherein the second direct connection with the remote server is a leased line connection.

11. The connection server of claim 8, wherein the session manager application establishes the first communications link through the first direct connection with a telecommunications provider device, and wherein the client device is connected to the telecommunications provider device.

12. The connection server of claim 11, wherein the first direct connection with the telecommunications provider device includes a leased line connection.

13. The connection server of claim 8, wherein the capacity management application manages an actual number of packets that flow between the client device and the remote server.

14. The connection server of claim 8, wherein the first direct connection between the client device and the connection server is over a wireless network with one or more network end-points and intermediate points that are addressable privately only.

15. The connection server of claim 8, wherein the first direct connection includes a section of a wireless data transmission and the second direct connection includes a leased line connection.

16. A method for providing secure communications for electronic transactions, comprising:
receiving an initiating connection signal from a client device at a connection server through a first connection that is between the client device and the connection server, wherein the client device and the connection server are addressable privately only, and the connection server comprising a session manager and a capacity management application for controlling a capacity of information traffic between the client device and a remote server to enable management of packets transmitted therebetween to selectively reduce cost of communication;
establishing a first communications link between the connection server and the client device through the first connection, wherein a first data transmission path for the first communications link is identifiable;
initiating a connection signal from the connection server to a remote server with the session manager application through a second connection that is between the connection server and the remote server;
establishing a second communications link between the connection server and the remote server through the second connection, wherein the remote server is addressable privately only and a second data transmission path for the second connection is identifiable; and
creating a secure private connection between the client device and the remote server upon the client device being connected with the remote server to perform electronic transactions through the connection server and across the first connection and the second connection.

17. The method of claim 16, wherein the capacity management application manages an actual number of packets that flow between the client device and the remote server.

18. The method of claim 16, further comprising authenticating, by the connection server, the client device and an identity of a client device user.

19. The method of claim 16, wherein the first connection or the second connection is a direct connection.

20. The method of claim 16, wherein the first connection between the client device and the connection server is over a wireless network with one or more network end-points and intermediate points that are addressable privately only.

21. The method of claim 16, wherein the first connection includes a section of a wireless data transmission and the second connection includes a leased line connection.

* * * * *

UNITED STATES PATENT AND TRADEMARK OFFICE
CERTIFICATE OF CORRECTION

PATENT NO.         : 8,886,813 B2                                    Page 1 of 1
APPLICATION NO.    : 13/794552
DATED              : November 11, 2014
INVENTOR(S)        : Frank S. Sanda et al.

It is certified that error appears in the above-identified patent and that said Letters Patent is hereby corrected as shown below:

Title Page, item (72) Inventors: Please correct the name of the third inventor Marc Winn, Atlanta, GA (US) to read as follows:

James Marcus Winn, Atlanta, GA (US)

Title Page, item (73) Assignee: Please insert a paragraph (73) Assignee to read as follows:

--(73) Assignee: Japan Communications, Inc., Tokyo, (JP)--

Signed and Sealed this
Seventeenth Day of November, 2015

Michelle K. Lee
*Director of the United States Patent and Trademark Office*